Patented Oct. 16, 1934

1,977,266

UNITED STATES PATENT OFFICE 1,977,266

MANUFACTURE OF AMINO-AZOBENZENES

Miles Augustinus Dahlen, Wilmington, Del., assignor to E. I. du Pont de Nemours & Company, Wilmington, Del., a corporation of Delaware No Drawing. Application January 25, 1934, Serial No. 708,313

5 Claims. (Cl. 260—96)

This invention relates to the manufacture of amino-azobenzenes. More particularly, it relates to new and improved processes for the manufacture of 4-amino-azobenzene (usually known as amino-azobenzene), an important intermediate used in the preparation of dyes, and certain substitution products thereof.

Numerous processes have been described for the manufacture on a large scale of amino-azobenzene. Usually, this material is produced in the form of its hydrochloric acid salt, commonly called amino-azobenzene-hydrochloride. The latter salt may be converted to the free base, if desired, by a simple treatment with an alkali. However, for most purposes the hydrochloride is used as such in the manufacture of dyes and other products.

The important technical methods for the preparation of amino-azobenzene are of two types. The first may be described briefly as follows:

Method 1

To a large quantity of aniline is added a quantity of hydrochloric acid sufficient to convert only a fraction (usually of the order of one-third) to aniline hydrochloride. Sodium nitrite is then added in the ratio of one-half mole to one mole of aniline hydrochloride. By this addition, the following diazotization reaction is effected:

(I) 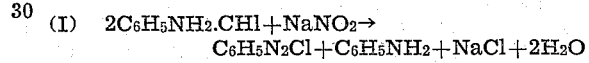

The benzene-diazonium-chloride thus produced immediately reacts with aniline to form diazoaminobenzene, according to the following reaction:

(II) 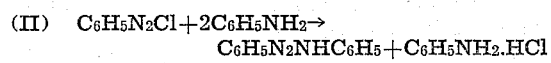

Obviously, the above processes are carried out under suitable conditions of temperature, agitation and so forth. The reaction mass, consisting of a mixture of aniline, aniline-hydrochloride and diazo-aminobenzene, is subjected to prolonged stirring at moderate temperatures (usually 25° C. to 40° C.), resulting in a slow conversion of the diazo-aminobenzene to amino-azobenzene. This conversion may be formulated as follows:

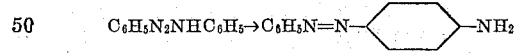

Considerable discussion may be found in the literature concerning the nature of the above conversion: Some investigators maintain that the process is one of molecular rearrangement; others insist that the diazo-aminobenzene reverts to aniline and benzene-diazonium-chloride and the latter couples with aniline in the para- position to produce amino-azobenzene. The mechanism of this conversion is not important in the sense of this application; it is important only to note that it takes place readily under the influence of aniline-hydrochloride.

When the conversion is complete, the reaction mass is drowned in aqueous hydrochloric acid, resulting in complete solution of the excess aniline as aniline-hydrochloride and conversion of the amino-azobenzene to its hydrochloride. Since amino-azobenzene-hydrochloride is quite insoluble in water, it is readily isolated by filtration. The filtrate is reserved for the recovery of aniline, which may then be returned to the process.

The second common commercial process is similar from a reaction standpoint, but quite different as to the operating technique. It may be described briefly as follows:

Method 2

Approximately 2.5 moles of aniline are dissolved in an equivalent quantity of aqueous hydrochloric acid. The mass is cooled to about 0° C. by the addition of ice or by external cooling. A mole of sodium nitrite is then added, maintaining the temperature at or near 0° C. The diazotization reaction (I), formulated above, is thus effected. Again the formation of diazo-aminobenzene, expressed by Equation (II) above, follows immediately. It is at this point that the two processes differ in an important respect: Method 1 at this point results in a substantially homogeneous reaction mass consisting of diazoaminobenzene, aniline-hydrochloride and aniline, the latter being present as the solvent. Little or no water is present in the reaction mixture. Method 2, on the other hand, results in a suspension of diazo-aminobenzene in an aqueous solution of aniline-hydrochloride.

The reaction mass obtained by Method 2 is stirred for several hours at specified temperatures, resulting in the slow conversion of the suspended diazo-aminobenzene to amino-azobenzene-hydrochloride. In a typical process, the temperature is held at 0° C. for an hour, is then raised to 20° C. for eight hours, and then to 40° C. until the conversion process is complete. When conversion is complete, an additional quantity of hydrochloric acid is added to convert any amino-azobenzene free base to the hydrochloride. The insoluble hydrochloride is separated by filtration, washed with dilute hydrochloric acid to remove adhering mother liquor, and is then in a suitable form for use in dye manufacture without further treatment. The mother liquor from the above filtration contains the aniline-hydrochloride used in excess of that required by the theory (0.5 moles per mole of amino-azobenzene theoretically obtained). Since this excess is very small, the filtrate is usually discarded; whereas in Method 1 the quantity of aniline-hydrochloride available is sufficiently large to necessitate recovery.

Although the yields obtainable according to Method 1 are of the order of 95% of the theory (based on sodium nitrite) while Method 2 results in only 80 to 85% yields on the same basis, the latter method is so much more convenient and economical to operate on a plant scale that it has largely supplanted the first process.

It is an object of this invention to provide a new and improved process of producing amino-azobenzenes. A further object is the development of an improved process for the manufacture of amino-azobenzene-hydrochloride by which it is possible to produce a satisfactory intermediate on a plant scale under more economical conditions than is possible according to the prior art. Other objects will appear hereinafter.

These objects are accomplished by starting with the solid amine-hydrochloride instead of a mixture of the primary aromatic amine and hydrochloric acid as in the prior art methods. For example, solid aniline-hydrochloride in the form of a powder is stirred to a paste with water, and sodium nitrite then added under diazotization temperature conditions. The conversion to the amino-azobenzene-hydrochloride is effected by heating the resultant diazo-aminobenzene under suitable conditions.

The use of the solid aniline-hydrochloride has at least two very important advantages. In the first place, the mere addition of water to solid aniline-hydrochloride results in a rapid lowering in temperature due to its negative heat of solution. In contrast with this, the formation of aniline-hydrochloride from aniline and aqueous hydrochloric acid, as described by Method 2 above, is a highly exothermic reaction, the temperature of the mixture usually rising to 70° C. to 100° C. As will be noted from the previous discussion of this process, it is next necessary to reduce the temperature to approximately 0° C. This has been effected by either or both of the following procedures: (I) Ice may be added to the aniline-hydrochloride solution in a quantity sufficient to lower the temperature to 0° C., or (II) the reaction may be carried out in a vessel so constructed that a cold brine or other refrigerant may be circulated through a jacket or immersed coil to produce the desired cooling. The first method requires the addition of a large quantity of ice, resulting in considerable dilution of the aniline-hydrochloride solution; while the second method is unattractive due to the necessity for providing complicated equipment constructed of materials not corroded by hydrochloric acid and aniline-hydrochloride, and because of the relatively high cost of cooling by refrigerants. On account of the cooling effect of the solid aniline-hydrochloride as used in the process of the present invention, only a comparatively small amount of additional cooling is required to obtain a suitable temperature for diazotization.

The second important advantage of the present invention lies in the fact that much more concentrated reaction mixtures and higher yields are possible than in the prior art methods. Commercial hydrochloric acid as used in large scale practice of the prior art processes is usually in the form of an aqueous solution of about 30% strength. The use of such a solution necessarily introduces a large quantity of water into the reaction zone.

It has been demonstrated, in the development of the improved process of the present invention, that the conversion of diazo-aminobenzene to amino-azobenzene and the resultant yields of the finished product are greatly dependent upon the quantity of aniline-hydrochloride present in the aqueous layer. Within moderate limits, the greater the quantity of aniline-hydrochloride present, the higher the yield. Further, it has been shown that the ratio of diazo-aminobenzene to water has a great effect on the yield of product; the smaller the quantity of water present, within practical limits, the better the yield of finished product. Since, by the present process, it is possible to carry out the conversion of the diazo-aminobenzene to aminoazobenzene under much more concentrated conditions than is economically possible according to the prior art, better yields of product are obtained and with no sacrifice in quality.

The invention will be further illustrated, but is not limited, by the following example, in which the quantities are stated in parts by weight.

Example

One hundred sixty-one parts of aniline-hydrochloride are stirred to a paste with 75 parts of water. Enough ice is then added to adjust the temperature to 0° C. Thirty-four and five-tenths parts of finely ground sodium nitrite are then added. As soon as the exothermic diazotization reaction results in a small temperature rise, ice is added. The addition of ice is continued at such a rate and in such quantity that the temperature is maintained at 0° C. to 5° C. for a period of one hour. A total of about 375 parts of ice is required.

The temperature is then raised to 20° C. and maintained at that point (by heating or cooling, as required) for ten hours. It is then raised to 30° C. and held at this point for four hours. It is then raised to 40° C. and held at this point until the conversion of diazo-aminobenzene to amino-azobenzene is complete.

A sufficient quantity of hydrochloric acid is now added to render the mass strongly acid to Congo Red papers. The charge is cooled to 20° C. and the insoluble amino-azobenzene-hydrochloride separated by filtration. The solid material is washed with dilute hydrochloric acid until free from mother liquor. A good yield of amino-azobenzene-hydrochloride is thus obtained. The product is suitable for use in the manufacture of dyes without further purification.

The solid amine-hydrochloride used as the starting material may be obtained by any process or from any source. It should preferably be in the form of a finely divided powder which is readily wetted, dissolved or pasted with water. Aniline-hydrochloride in this form is now cheaply available by the vapor phase reaction of aniline with hydrogen chloride; whereas the more expensive product obtained by the older methods is in the form of large crystals which are much less readily dissolved or pasted with water.

The amount of water initially used may vary within relatively wide limits but should preferably be insufficient to dissolve all of the amine-hydrochloride. Although the amount of water should preferably be as low as possible, the lower practical limit is that ratio of water to amine-hydrochloride which gives a pasty mass that can be agitated readily. Of course, as the reaction proceeds, the amine-hydrochloride is used up and a point is approached where all of the remaining amine-hydrochloride is in solution.

The diazotization may be effected by the use of sodium nitrite or other source of nitrous acid, and the sodium nitrite may be added as a solid or in an aqueous solution.

The conversion of diazo-aminobenzene to amino-azobenzene may be effected under rather widely varying conditions of temperature, agitation, acidity, ratio of aniline-hydrochloride to diazo-aminobenzene, etc. The conditions defined in the above example are, however, the preferred conditions.

The reactions may be carried out in various types of equipment. A kettle of the conventional type, equipped with an agitator and the usual accessories and constructed of a material or materials resisting the corrosive action of the reaction mass, may be used with good results. However, open tubs or vats of proper design and constructed of suitable materials may also be used with equally good results.

When conversion of the diazo-aminobenzene to amino-azobenzene is complete, the reaction mass may be worked up for the isolation of the finished product by varying methods. The amino-azobenzene may be produced as the hydrochloride as described in the above example, or it may be found desirable to convert the salt to the free base. In the latter case, it may also be found necessary, when the product is to be used for certain specific purposes, to purify the free base by some process such as crystallization from a solvent.

It will also be understood by one skilled in the art that similar processes may be utilized for the manufacture of other similar amino-azo compounds. For example, ortho-toluidine can now be produced readily and cheaply in the form of the hydrochloride, and, by processes similar to those disclosed in the present invention, can be readily converted to 2:3'-dimethyl-4'-amino-azobenzene. Similar processes may be applied to meta-toluidine, various xylidines or mixtures of xylidines, as well as to mixtures of toluidines and xylidines or even more complex systems. In any case, the principles outlined above may be utilized in devising procedures which will give results representing substantial improvements over the disclosures of the prior art.

Amino-azobenzene and the other products advantageously prepared by the improved processes of the present invention are important intermediates in the manufacture of azo dyes. It will be apparent, therefore, that the present invention, by providing an improved process for the manufacture of these intermediates as outlined above, facilitates the production of the various azo dyestuffs produced from these intermediates.

As many apparently widely different embodiments of this invention may be made without departing from the spirit and scope thereof, it is to be understood that I do not limit myself to the specific embodiments thereof except as defined in the following claims.

I claim:

1. In a process of producing amino-azobenzenes and salts thereof by the reaction of an amine-hydrochloride of the benzene series with sodium nitrite in the presence of water, followed by conversion of the resultant diazo-aminobenzene into the amino-azobenzene, the step which comprises introducing the amine-hydrochloride into the reaction zone in the form of a solid.

2. In a process of producing 4-amino-azobenzene and salts thereof by the reaction of aniline-hydrochloride with sodium nitrite, in the presence of water, followed by heating of the reaction mixture to convert the diazo-amino-benzene into the amino-azobenzene, the step which comprises introducing the aniline hydrochloride into the reaction zone in the form of a solid.

3. In a process of producing 4-amino-azobenzene, the steps which comprise mixing solid aniline-hydrochloride with at least enough water to form a paste but insufficient water for complete solution, immediately adjusting the temperature to diazotization temperature, and adding sodium nitrite.

4. The process of producing 4-amino-azobenzene which comprises stirring solid aniline-hydrochloride into a paste with water, immediately thereafter adjusting the temperature to about 0° C., adding sodium nitrite and maintaining the temperature at about 0° C. to 5° C. for one hour, then maintaining the temperature at about 20° C. for about ten hours, raising the temperature to 30° C. for about four hours and then to about 40° C. until the conversion of diazo-aminobenzene to amino-azobenzene is substantially complete, adding hydrochloric acid to render the mass strongly acid, cooling the resultant mixture to 20° C., and separating the insoluble amino-azobenzene-hydrochloride.

5. The process of producing 4-amino-azobenzene which comprises stirring about 161 parts of powdered aniline-hydrochloride prepared by the vapor phase reaction of aniline and hydrogen chloride, into a paste with about 75 parts of water, then adding enough ice to adjust the temperature to about 0° C., adding about 34.5 parts of finely ground sodium nitrite, maintaining the temperature at about 0° C. to 5° C. for a period of one hour by the addition of ice, then raising the temperature to 20° C. and maintaining at this point for about ten hours, thereafter raising the temperature to about 30° C. for about four hours, then raising the temperature to about 40° C. until the conversion of diazo-aminobenzene to amino-azobenzene is substantially complete, adding hydrochloric acid in sufficient amount to render the reaction mass strongly acid, cooling to about 20° C., and filtering the insoluble 4-amino-azobenzene-hydrochloride.

MILES AUGUSTINUS DAHLEN.